US006775626B1

(12) United States Patent
Gatewood et al.

(10) Patent No.: US 6,775,626 B1
(45) Date of Patent: Aug. 10, 2004

(54) SYSTEM FOR AUTOMATICALLY SELECTING AN OIL PRESSURE SENSOR PROCESSING ALGORITHM BASED ON OIL PRESSURE SENSOR TYPE

(75) Inventors: Bryan S. Gatewood, Westport, IN (US); Gregory A. Huey, Noblesville, IN (US); Jeffrey D. Daiker, Elizabethtown, IN (US); Christopher H. Bachmann, Columbus, IN (US)

(73) Assignee: Cummins, Inc., Columbus, IN (US)

(*) Notice: Subject to any disclaimer, the term of this patent is extended or adjusted under 35 U.S.C. 154(b) by 0 days.

(21) Appl. No.: 10/376,820

(22) Filed: Feb. 28, 2003

(51) Int. Cl.[7] .................................................. G01F 23/00

(52) U.S. Cl. ........................ 702/50; 702/104; 73/54.06; 73/61.78

(58) Field of Search .............................. 702/50, 52, 55, 702/57, 47, 104; 340/603; 315/86, 82; 307/10.8; 73/54.01, 64.41, 304 C, 54.06, 61.78

(56) References Cited

U.S. PATENT DOCUMENTS 4,646,070 A * 2/1987 Yasuhara et al. ........... 340/603
5,144,864 A * 9/1992 Sawasaki et al. ............. 477/39
5,329,204 A * 7/1994 Ricca .......................... 315/82
5,432,497 A 7/1995 Briski et al.
5,775,296 A 7/1998 Goras et al.
6,269,300 B1 7/2001 Moore-McKee et al.
6,326,704 B1 12/2001 Breed et al.
6,353,785 B1 3/2002 Shuman et al.
6,382,122 B1 5/2002 Gaynor et al.
6,459,995 B1 * 10/2002 Collister ...................... 702/23
2002/0023500 A1 2/2002 Chikuan et al.

* cited by examiner

*Primary Examiner*—John Barlow
*Assistant Examiner*—Hien Vo
(74) *Attorney, Agent, or Firm*—Barnes & Thornburg LLP

(57) ABSTRACT

A system for automatically selecting an oil pressure sensor processing algorithm based on oil pressure sensor type includes an oil pressure sensing device producing an signal indicative of engine oil pressure, and electrically connected to one of an analog and a switch input of a control computer. The control computer is configured to identify the oil pressure sensing device as an analog oil pressure sensor and process the oil pressure signal according a corresponding signal processing algorithm if a voltage level at the analog input is within a predefined voltage range while a voltage level at the switch input is at or near a first voltage level, and to identify the oil pressure sensing device as an oil pressure switch and process the oil pressure signal according a corresponding signal processing algorithm if the voltage level at the switch input is at or near a second voltage level.

23 Claims, 4 Drawing Sheets

TO FIG. 3B

SYSTEM FOR AUTOMATICALLY SELECTING AN OIL PRESSURE SENSOR PROCESSING ALGORITHM BASED ON OIL PRESSURE SENSOR TYPE

FIELD OF THE INVENTION

The present invention relates generally to systems for discriminating between different types of engine operating condition sensors, and more specifically to such systems operable to automatically select an appropriate sensor processing algorithm based on the detected sensor type.

BACKGROUND OF THE INVENTION

Oil pressure sensors for internal combustion engines have heretofore been implemented with a number of different types of pressure sensing devices. For example, one type of oil pressure sensing device that is commonly implemented is an analog pressure sensor producing an analog voltage that is proportional to the engine oil pressure. Another type of commonly implemented oil pressure sensing device is an oil pressure switch having a pressure switch point set at a specified pressure level. At engine oil pressures below the pressure switch point the oil pressure switch produces one voltage level, and at oil pressures above the pressure switch point the oil pressure switch produces a different voltage level. While both of the foregoing types of oil pressure sensing devices are widely used, each require different oil pressure signal processing algorithms for producing oil pressure values to be monitored by the vehicle operator and/or to be used by one or more engine control algorithms.

In many engine applications, the oil pressure sensing device may be implemented with either of the foregoing oil pressure sensing device types, and the type of oil pressure sensing device used with any one engine may not be known until after the engine is completed and accessorized. This then requires a subsequent determination of oil pressure sensing device type and attendant implementation of an appropriate oil pressure signal processing algorithm. What is therefore needed is a system for automatically determining the type of oil pressure sensing device implemented in an engine, and then automatically selecting and implementing an appropriate oil pressure signal processing algorithm based on the detected oil pressure sensing device type.

SUMMARY OF THE INVENTION

The present invention may comprise one or more of the following features and combinations thereof. A system for automatically selecting an oil pressure sensor processing algorithm based on oil pressure sensor type may comprise an oil pressure sensing device producing an oil pressure signal indicative of oil pressure in an internal combustion engine, wherein the oil pressure sensing device may be one of an analog oil pressure sensor and an oil pressure switch, and a control computer having an analog input and a switch input with the oil pressure sensing device electrically connected to one of the analog and switch inputs. The control computer may be configured to identify the oil pressure sensing device as the analog oil pressure sensor and process the oil pressure signal according to a corresponding analog oil pressure sensor processing algorithm if a voltage level at the analog input is within a predefined voltage range while a voltage level at the switch input is at or near a first voltage level, and to identify the oil pressure sensing device as the oil pressure switch and process the oil pressure signal according a corresponding oil pressure switch processing algorithm if the voltage level at the switch input is at or near a second voltage level different from the first voltage level.

The system may further include an ignition switch having at least an off position and an on position, and the control computer may be responsive to the ignition switch switching from the off position to the on position to monitor the voltage level at the analog input and the voltage level at the switch input.

The predefined voltage range may be defined between a third voltage level greater than ground potential and a supply voltage, and the first voltage level may be the supply voltage. The second voltage level may be ground potential.

Alternatively, the control computer may be configured to identify the oil pressure sensing device as the analog oil pressure sensor and process the oil pressure signal according to a corresponding analog oil pressure sensor processing algorithm if a voltage level at the analog input is at or near a first voltage level and a voltage level at the switch input is at or near a second voltage level different than the first voltage level and if the oil pressure sensing device was identified in a preceding engine operating cycle as the analog oil pressure sensor. In this case, the first voltage level may be ground potential, and the second voltage level may be a supply voltage.

Alternatively still, the control computer may be configured to identify the oil pressure sensing device as the oil pressure switch and process the oil pressure signal according to a corresponding oil pressure switch processing algorithm if a voltage level at the analog input is at or near a first voltage level and a voltage level at the switch input is at or near a second voltage level different than the first voltage level and if the oil pressure sensing device was identified in a preceding engine operating cycle as the oil pressure switch. In this case, the first voltage level may be ground potential, and the second voltage level may be a supply voltage.

In any case, the control computer may be configured to conduct an initial identification of the oil pressure sensing device if the oil pressure sensing device was not identified in a preceding engine operating cycle. In this case, the system may further include an engine speed sensor producing an engine speed signal indicative of engine rotational speed, and the control computer may be responsive to the ignition switch switching from the off position to the on position to conduct the initial identification of the oil pressure sensing device by monitoring the voltage level at the analog input and the voltage level at the switch input and determining a first oil pressure sensing device type based on the voltage levels at the analog and switch inputs. The control computer may identify the oil pressure sensing device as the first oil pressure sensing device type if the engine speed signal remains below an engine speed threshold for a predefined time period.

The control computer may further be configured to determine a second oil pressure sensor device type based on the voltage levels at the analog and switch inputs if the engine speed signal does not remain below the engine speed threshold for the predefined time period, and the control computer may identify the oil pressure sensor device as the first oil pressure sensing device type if the first and second oil pressure sensor device types are identical and otherwise identify the oil pressure sensor device as a preselected one of the analog oil pressure sensor and the oil pressure switch. The preselected one of the analog oil pressure sensor and the oil pressure switch may be the oil pressure switch, or may alternatively be the analog oil pressure sensor.

These and other objects of the present invention will become more apparent from the following description of the illustrative embodiments.

DESCRIPTION OF THE ILLUSTRATIVE EMBODIMENTS

Figure 1:
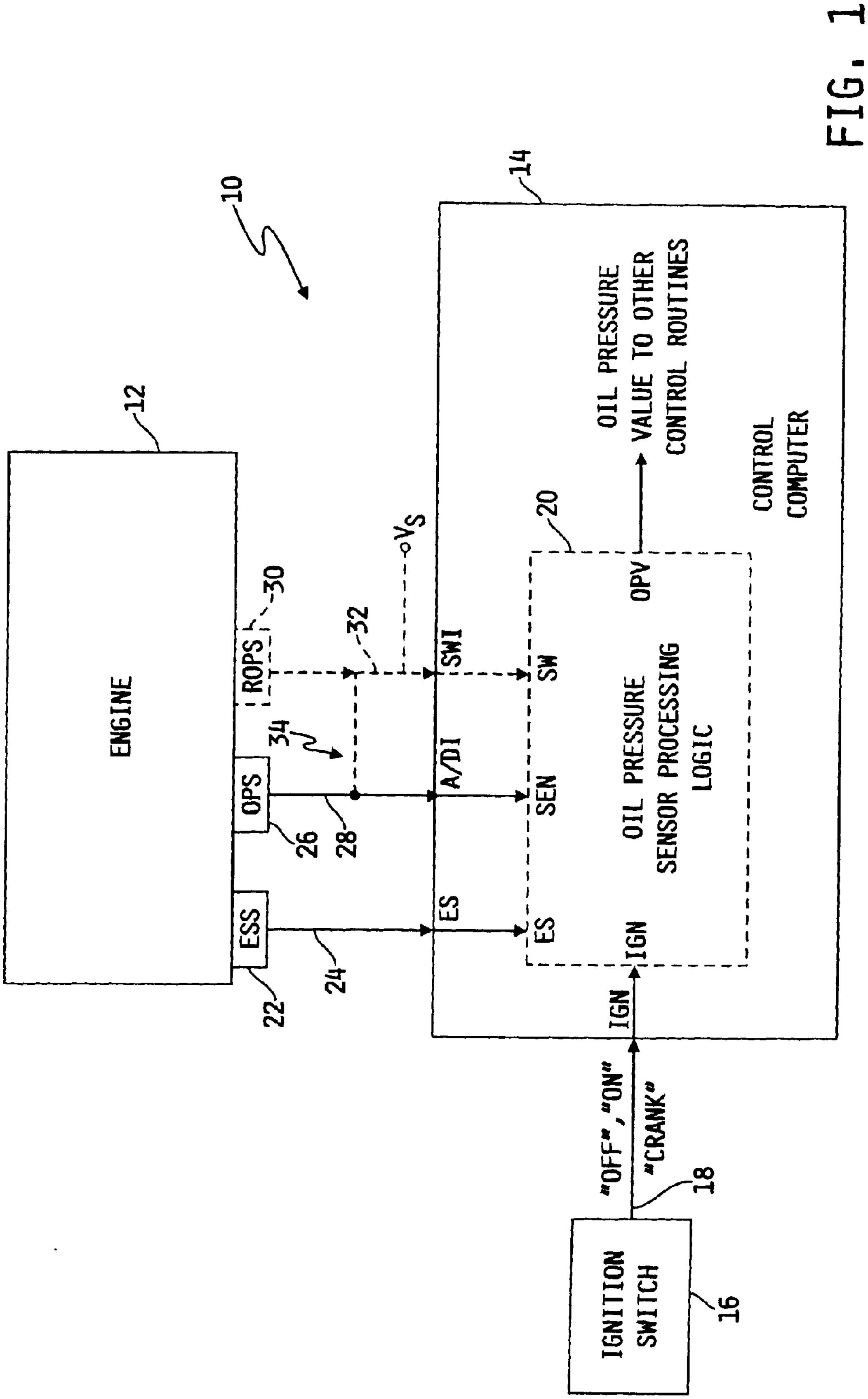
FIG. 1 is a diagram of one illustrative embodiment of a system for automatically selecting an oil pressure sensor processing algorithm based on oil pressure sensor type.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Referring now to FIG. 1, one illustrative embodiment of a system 10 for automatically selecting an oil pressure sensor processing algorithm based on oil pressure sensor type is shown. System 10 includes an internal combustion engine 12 electrically coupled to a control computer 14 via a number of engine operating condition sensors, subsystems, actuators and the like, as is known in the art. In one embodiment, control computer 14 is a microprocessor-based engine controller that is generally operable to control and manage the overall operation of engine 12. In this embodiment, control computer 14 may be a known control unit sometimes referred to as an electronic or engine control module (ECM), electronic or engine control unit (ECU) or the like. Alternatively, control computer 14 may be a general purpose or application specific control circuit capable of operation as will be described hereinafter.

Control computer 14 includes a number of inputs for receiving signals from various sensors or sensing systems associated with system 10. For example, engine 12 includes an engine speed sensor 22 electrically connected to an engine speed input, ES, of control computer 14 via signal path 24. In one embodiment, engine speed sensor 22 is a Hall effect sensor operable to sense passage thereby of a number of teeth formed on a gear or tone wheel rotating synchronously with the engine crankshaft (not shown). Alternatively, engine speed sensor 22 may be any known sensor operable to sense engine rotational speed including, for example, a variable reluctance sensor. In any case, engine speed sensor 22 is operable to produce an engine speed signal on signal path 24 indicative of rotational speed of the engine 12.

System 10 further includes an ignition switch 16 electrically connected to an ignition input, IGN, of control computer 14 via signal path 18. Ignition switch 16 may be of known construction and has three switch positions; "off", "on" and "crank." As is known in the art, system power is applied to control computer 14 and other subsystems within system 10 when the ignition switch 16 is switched from the "off" position to the "on" position, and the engine starting system (not shown) is activated when the ignition switch is switched from the "on" to the "crank" position.

System 10 further includes an oil pressure sensor (OPS) 26 operable to produce an oil pressure signal indicative of engine oil pressure. In one embodiment, the oil pressure sensor 26 is an analog oil pressure sensor of known construction and electrically connected to an analog-to-digital input, A/DI, of control computer 14 via signal path 28. In this embodiment, the oil pressure sensor 26 is operable to produce analog oil pressure signal on signal path 28 having an analog voltage that is proportional to the engine oil pressure.

In an alternate embodiment, the oil pressure sensor 26 is an oil pressure switch of known construction and electrically connected to a switch input, SWI, of control computer 14 via signal path 32 as shown in phantom. In this embodiment, the oil pressure switch 26 is operable to produce an oil pressure signal on signal path 32 having a voltage at or near a first potential when the switch is closed, and having a voltage at or near a second potential, discernable from the first potential, when the switch is open. For example, in one specific embodiment switch 26 produces a voltage on signal path 32 that is at or near ground potential when the switch is closed, and that is at or near a supply voltage, $V_S$, (shown in phantom in FIG. 1) when the switch is open. Those skilled in the art will recognize that the oil pressure switch 26 may alternatively be configured to produce other discernable voltage levels to discriminate between closed and open switch positions, and such alternative configurations are intended to fall within the scope of the claims appended hereto. In any case, the oil pressure switch 26 in this embodiment is configured to switch states at a predefined oil pressure level, and to include some hysteresis to avoid rapid switching about the pressure switch point. In one specific embodiment, for example, the oil pressure switch 26 has a switch point of approximately 6 psi, although other switch points are contemplated.

Optionally, as shown in phantom in FIG. 1, system 10 may further include a redundant oil pressure sensor (ROPS) 30 electrically connected to control computer 14 via either of signal paths 28 or 32. In embodiments of system 10 wherein the oil pressure sensor 26 is an analog oil pressure sensor electrically connected to the A/DI input of control computer 12 via signal path 28, the redundant oil pressure sensor 30 is an oil pressure switch of the type just described and electrically connected to the switch input, SWI, of control computer 14 via signal path 32. Conversely, in embodiments of system 10 wherein the oil pressure sensor 26 is an oil pressure switch of the type just described and electrically connected to the switch input, SWI, of control computer 14 via signal path 32, the redundant oil pressure sensor 30 is an analog oil pressure sensor electrically connected to the A/DI input of control computer 14 via signal path 28.

Alternatively still, system 10 may include a wiring harness 34 electrically connected to the A/DI and SWI inputs of control computer 14 via signal paths 28 and 32 respectively. In this embodiment, while the engine 12 may be configured to accept only a single oil pressure sensor, the wiring harness 34 is configured for connection to an analog oil pressure sensor and to an oil pressure switch. The wiring harness 34 is configured such that an analog oil pressure sensor connected thereto is routed via signal path 28 to the A/DI input of control computer 14, whereas an oil pressure switch connected thereto is routed via signal path 32 to the SWI input of control computer 14. In this embodiment, the wiring harness 34 may thus be operatively connected to two oil pressure sensing devices; namely an analog oil pressure sensor and an oil pressure switch, while only one such pressure sensing device is operatively coupled to the engine 12.

The control computer 14 includes an oil pressure sensor processing logic block 20 having an ignition input, IGN, receiving the ignition signal produced by the ignition switch 16, an engine speed input, ES, receiving the engine speed signal from the engine speed sensor 22, an analog oil pressure sensor input, SEN, receiving the voltage at the A/DI input of control computer 14 and an oil pressure switch input, SW, receiving the voltage at the SWI input of control computer 14. Logic block 20 includes memory for storing an identified oil pressure sensor type as well as one or more oil pressure sensor identification flags.

Logic block 20 further includes therein at least two known oil pressure signal processing algorithms. A first one of the algorithms is configured to process oil pressure signals produced by an analog oil pressure sensor by converting the analog oil pressure signal to digital count values, and then mapping the digital count values to corresponding pressure values as is known in the art. In one embodiment, the analog oil pressure sensor operates between 0–5 volts, wherein a valid sensor range is defined between 0.3–4.6 volts, a sensor out-of-range low condition exists for sensor voltages below 0.3 volts and a sensor out-of-range high condition exists for sensor voltages in excess of 4.6 volts. Those skilled in the art will recognize, however, that the analog oil pressure sensor may alternatively be configured to operate between other voltages levels, and that the valid sensor range, out-of-range low and out-of-range high voltage values will typically be dictated by the application. Any such alternate operating ranges and/or levels are intended to fall within the scope of the claims appended hereto.

A second one of the algorithms included within the logic block 20 is configured to process oil pressure signals produced by an oil pressure switch by converting the two discrete switch outputs to digital count values, and then mapping the two digital count values to corresponding pressure values as is known in the art. In one embodiment, the oil pressure switch operates between 0–5 volts, with a switch point, including hysteresis, centered around 2.5 volts. The voltage at the A/DI input of control computer 14 (corresponding to the SW input of logic block 20) is at or near ground potential (0.0 volts) when the oil pressure switch is closed, and is at or near 5.0 volts when the oil pressure switch is open. In one specific embodiment, the switch point of the oil pressure switch is approximately 6 psi so that the switch remains closed at oil pressures less than approximately 6 psi, and opens at oil pressures above approximately 6 psi. Those skilled in the art will recognize, however, that the oil pressure switch may alternatively be configured to operate at other voltages levels and switch points, and that such other voltage levels and switch points will generally be dictated by the application. Any such alternate operating voltages ranges and/or switch points are intended to fall within the scope of the claims appended hereto.

The oil pressure sensor processing block 20 further includes one or more software algorithms configured to automatically detect the type of oil pressure sensing device or devices coupled to the engine 12 or otherwise connected to the wiring harness 34, and to select an appropriate one of the foregoing oil pressure signal processing algorithms to process the oil pressure signal and produce a corresponding oil pressure value, OPV. Block 20 produces the oil pressure value at output OPV, wherein this oil pressure value is then provided to one or more control algorithms contained within and/or executed by control computer 14.

Figure 2:
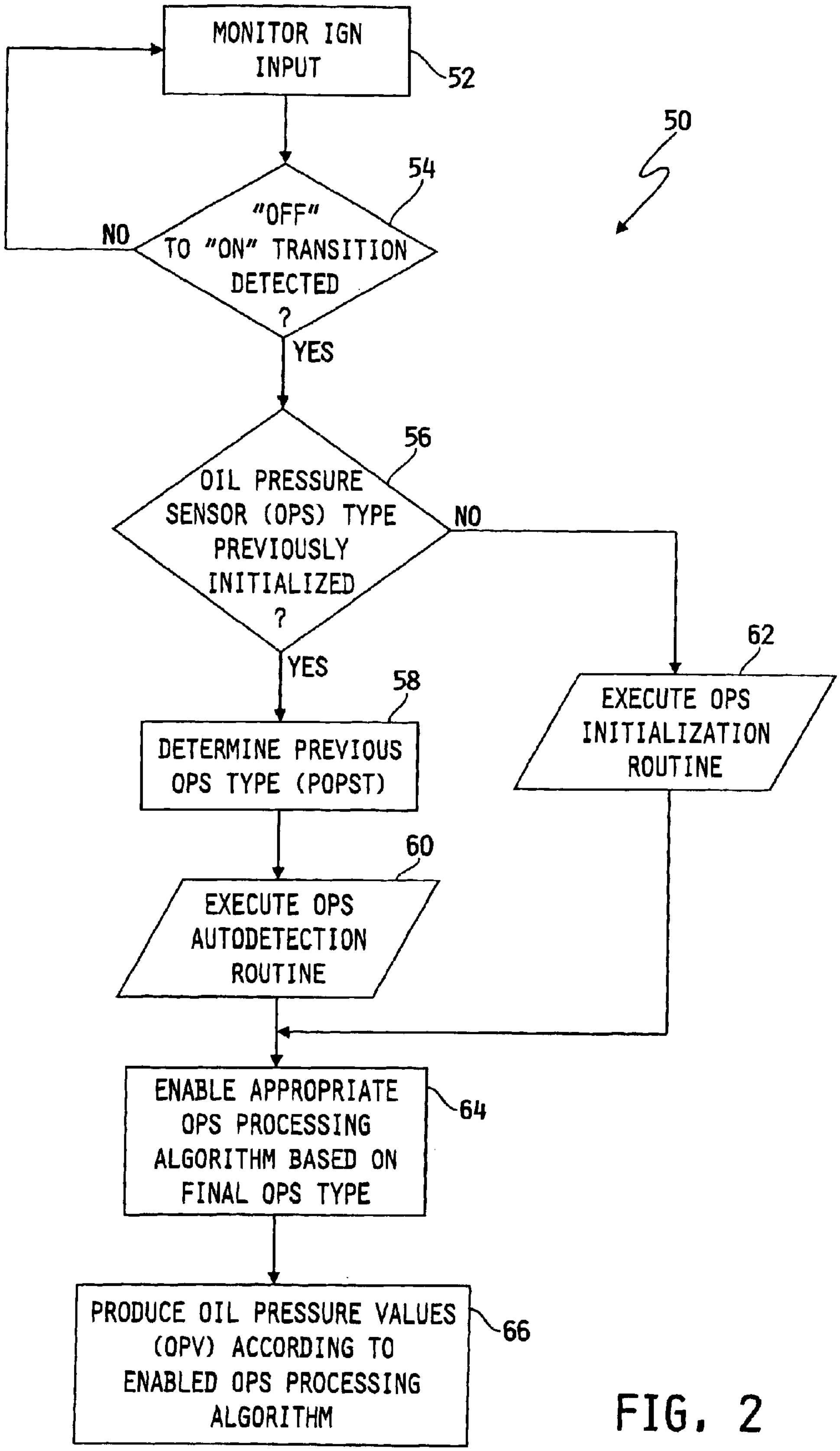
FIG. 2 represents a flowchart of one illustrative embodiment of a software algorithm for automatically selecting an oil pressure sensor processing algorithm, in the system of FIG. 1, based on oil pressure sensor type.

Referring now to FIG. 2, a flowchart is shown of one illustrative embodiment of a software algorithm 50 for automatically selecting an oil pressure sensor processing algorithm, in the system 10 of FIG. 1, based on oil pressure sensor type. Algorithm 50 is stored within the memory unit (not shown) of the control computer 14, and is executable by control computer 14 to select an appropriate oil pressure sensor signal processing algorithm. Algorithm 50 begins at step 52 where the control computer 14 is operable to monitor the voltage at the ignition input, IGN. Thereafter at step 54, control computer 14 operable to determine from the IGN voltage whether the ignition switch 16 has switched from the "off" to the "on" position. If no such transition has been detected, algorithm execution loops back to step 52. If, however, control computer 14 determines at step 54 that the ignition switch 16 has switched from the "off" to the "on" position, algorithm execution advances to step 56 where control computer determines whether an oil pressure sensor (OPS) type has previously been initialized.

As described hereinabove, logic block 20 includes memory for storing an identified oil pressure sensor type as well as one or more oil pressure sensor identification flags. In one embodiment, for example, the memory within block 20 includes a storage location for storing a previous oil pressure sensor type (POPST) identifier and a storage location for storing a previous OPS type flag status. The first time that algorithm 50 is executed, the POPST identifier location will be empty and the previous OPS type flag will be set to false, both indicating that no oil pressure sensor type has previously been identified. In this embodiment, control computer 14 is operable at step 56 to determine whether the oil pressure sensor type was previously initialized by determining the status of the OPS type flag. If true, then the oil pressure sensor type was previously initialized, and if false then it was not. Alternatively, the control computer 14 may be operable at step 56 to determine whether the oil pressure sensor type was previously initialized by determining the contents of the POPST identifier location. If blank, then the oil pressure sensor type was not previously initialized, and if the POPST identifier location instead has either SENSOR or SWITCH stored therein then the oil pressure sensor type was previously initialized. Those skilled in the art will recognize other known techniques for determining whether an oil pressure sensor type was previously initialized, and such other known techniques are intended to fall within the scope of the claims appended hereto.

In any case, if control computer 14 determines at step 56 that the oil pressure sensor type was previously initialized, algorithm execution advances to step 58 where control computer 14 is operable to determine the previously identified oil pressure sensor type (POPST) by reading this value from the POPST memory location. Thereafter at step 60, control computer 14 is operable to execute an oil pressure sensor autodetection routine. The oil pressure sensor autodetection routine is configured to allow the control computer 14 to automatically determine the type of oil pressure sensor electrically connected thereto, when the oil pressure sensor type has been previously initialized, and to select a specified oil pressure sensor type if more than one sensor type is detected as being electrically connected to control computer 14. One embodiment of such an autodetection routine will be described more fully hereinafter with respect to FIG. 4.

If, on the other hand, control computer 14 determines at step 56 that the oil pressure sensor type was not previously initialized, algorithm execution advances to step 62 where control computer 14 is operable to execute an oil pressure sensor initialization routine. The oil pressure sensor initialization routine is configured to allow control computer 14 to automatically determine the type of oil pressure sensor electrically connected thereto, when the oil pressure sensor type has not been previously initialized, and to select a specified oil pressure sensor type if more than one sensor type is detected as being electrically connected to control computer 14. One embodiment of such an autodetection routine will be described more fully hereinafter with respect to FIGS. 3A and 3B.

From either of steps 60 and 62, algorithm execution advances to step 64 where control computer 14 is operable to enable an appropriate one of the oil pressure sensor signal processing algorithms described hereinabove based on the final oil pressure sensor type determined at step 60 or 62. For example, if the final OPS type is SENSOR, then control computer 14 is operable at step 64 to enable the "first" algorithm described hereinabove, which is configured to process oil pressure signals produced by an analog oil pressure sensor by converting the analog oil pressure signal to digital count values, and then mapping the digital count values to corresponding pressure values as is known in the art. On the other hand, if the final OPS type is SWITCH, then control computer 14 is operable at step 64 to enable the "second" algorithm described hereinabove, which is configured to process oil pressure signals produced by an oil pressure switch by converting the two discrete switch outputs to digital count values, and then mapping the two digital count values to corresponding pressure values as is known in the art.

Following step 64, the oil pressure sensor processing logic block 20 is operable to produce oil pressure sensor values (OPV) according to the OPS processing algorithm that was enabled at step 64. Step 66 is executed continually until the next "off" to "on" transition of the ignition switch 16 is detected.

Figure 3A:
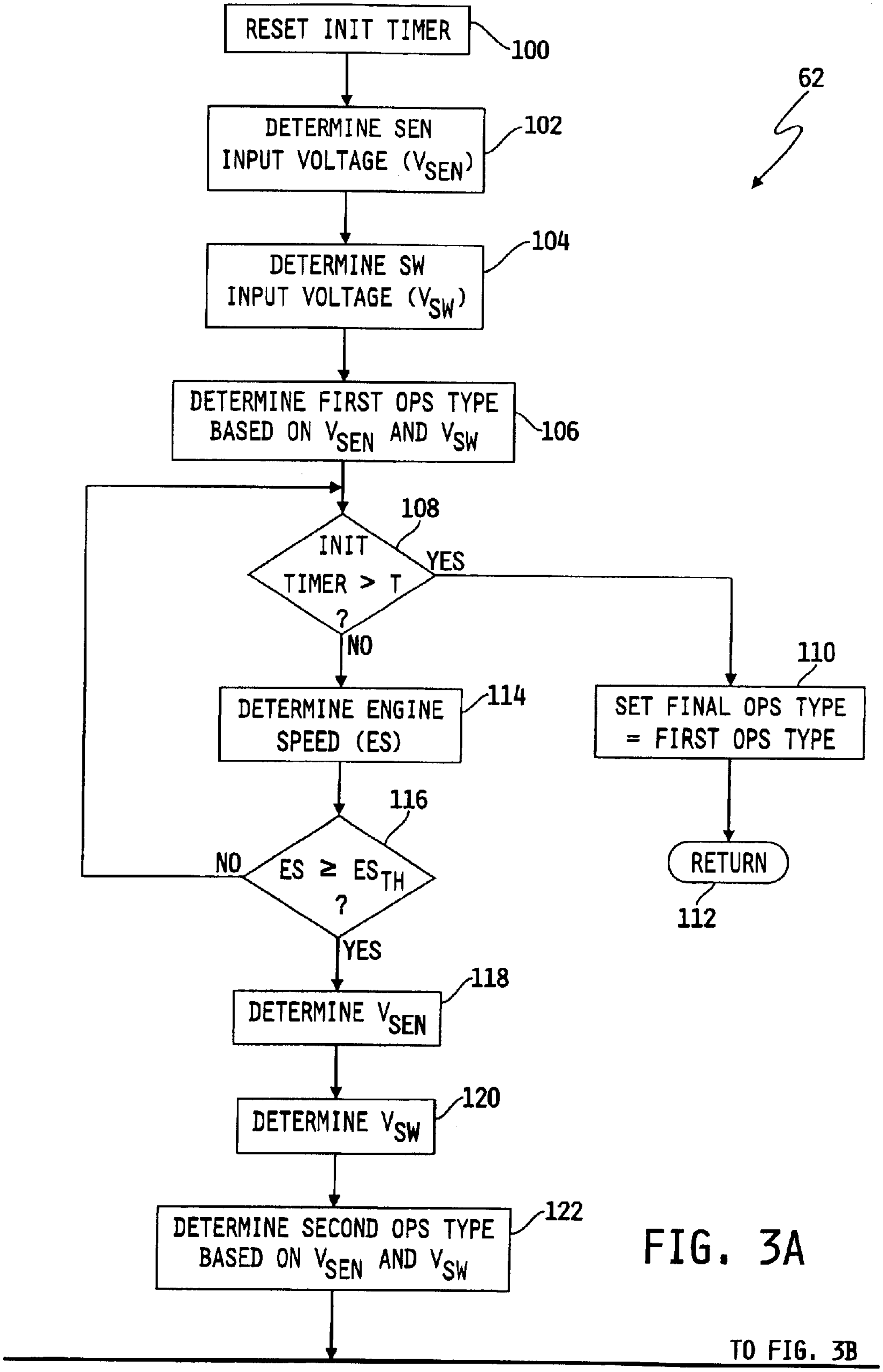
FIGS. 3A and 3B represent a flowchart of one illustrative embodiment of the oil pressure sensor initialization routine depicted at step 62 in the flowchart of FIG. 2.
Figure 3B:
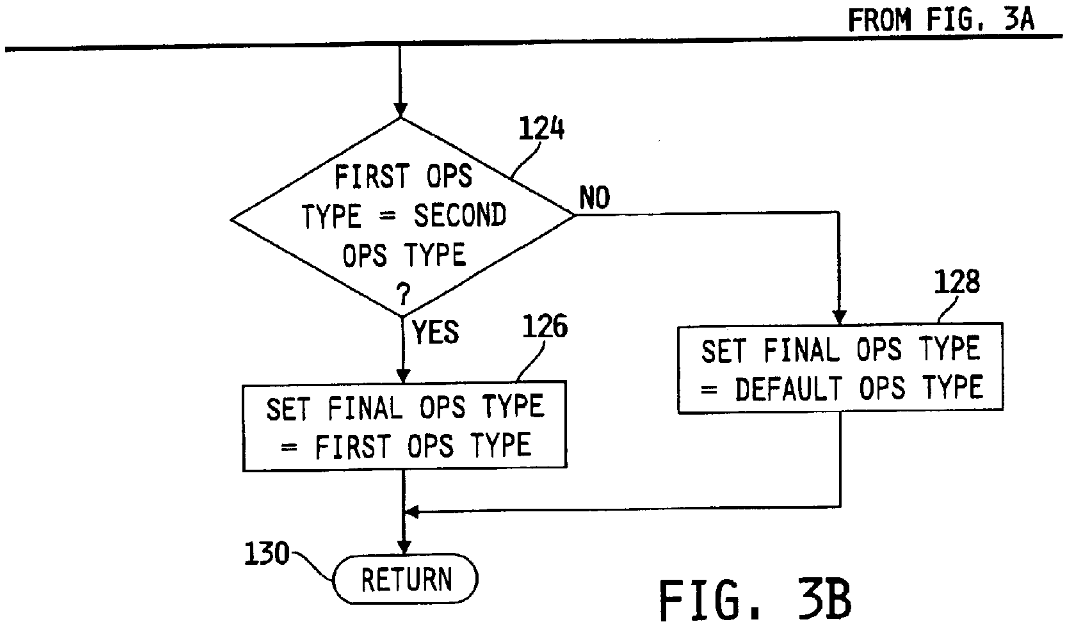

Referring now to FIGS. 3A and 3B, one illustrative embodiment of the OPS initialization routine 62 of algorithm 50, is shown. Routine 62 begins at step 100 where control computer 14 is operable to reset an initialization timer (INIT TIMER). Thereafter at step 102, control computer 14 is operable to determine the voltage, $V_{SEN}$, at the SEN input of logic block 20, corresponding to the A/DI input of control computer 14. Thereafter at step 104, control computer 14 is operable to determine the voltage, $V_{SW}$, at the SW input of logic block 20, corresponding to the SWITCH input of control computer 14. Thereafter at step 106, control computer 14 is operable to determine a first oil pressure sensor type based on $V_{SEN}$ and $V_{SW}$. In one embodiment, control computer 14 is operable to execute step 106 according to the $V_{SEN}$ and $V_{SW}$ assignments set forth in the following Table 1.

TABLE 1

| | | | | $V_{SW}$ | | |
|---|---|---|---|---|---|---|
| | Open (0.0 V) | $V_{SEN}$ In-Range | Closed (5.0 V) | Open (5.0 V) | Closed (0.0 V) | Result |
| Valid Sensor | | X | | X | | SENSOR |
| Valid Switch | X | | | | X | SWITCH |
| Default 1 | | X | | | X | SWITCH |
| Default 2 | | | X | | X | SWITCH |
| Out-of-range high | | | X | X | | SENSOR |
| Out-of-range low or indeterminate | X | | | X | | SENSOR |

Those skilled in the art will recognize that Table 1 represents one illustrative $V_{SEN}$ and $V_{SW}$ assignment arrangement, and that alternate assignment arrangements may be implemented. For example, either or both of the default assignments may alternatively be set to SENSOR. Any such alternate assignment arrangements are intended to fall within the scope of the claims appended hereto.

Following step 106, algorithm execution advances to step 108 where control computer 14 is operable to determine whether the initialization timer has timed out by exceeding a predefined time value T. If so, algorithm execution advances to step 110 where control computer 14 is operable to set the final OPS type to the first OPS type; e.g., SENSOR or SWITCH, as determined at step 106. Algorithm execution thereafter returns to its calling routine. If, on the other hand, control computer 14 determines at step 108 that the initialization timer has not timed out; i.e., has not exceeded the predefined time value T, then algorithm execution advances to step 114 where control computer 14 is operable to determine engine speed; e.g., by monitoring the output of the engine speed sensor 22. Thereafter at step 116, control computer 14 is operable to determine whether the engine speed, ES, is in excess of an engine speed threshold, $ES_{TH}$. In one embodiment, steps 114 and 116 are included to allow control computer 14 to distinguish between a running and non-running engine 12. In this embodiment, $ES_{TH}$ is nominally zero, but for practical purposes is set at the minimum engine speed value that is discernible by the engine speed sensor 22 and control computer 14. Alternatively, $ES_{TH}$ may be set at other threshold values, and any such alternative threshold values are intended to fall within the scope of the claims appended hereto.

If, at step 116, control computer 14 determines that engine speed, ES, has not exceeded $ES_{TH}$, algorithm execution loops back to step 108. If, on the other hand, control computer 14 determines at step 116 that engine speed, ES, has exceeded $ES_{TH}$, algorithm execution advances to step 118 where control computer 14 is operable to again determine the voltage, $V_{SEN}$, at the SEN input of logic block 20, corresponding to the A/DI input of control computer 14. Thereafter at step 120, control computer 14 is operable to again determine the voltage, $V_{SW}$, at the SW input of logic block 20, corresponding to the SWITCH input of control computer 14. Thereafter at step 122, control computer 14 is operable to determine a second oil pressure sensor type based on $V_{SEN}$ and $V_{SW}$, and in one embodiment control computer 14 is operable to execute step 122 according to the $V_{SEN}$ and $V_{SW}$ assignments set forth in Table 1.

Following step 122, algorithm execution advances to step 124 where control computer is operable to compare the first and second oil pressure sensor types. If, at step 124, control computer 14 determines that the first and second oil pressure sensor types are identical, then algorithm execution advances to step 126 where control computer 14 sets the final oil pressure sensor type equal to the first (or second) oil pressure sensor type. If, at step 124, control computer 14 determines that the first and second oil pressure sensor types are not identical, algorithm execution advances to step 128 where control computer 14 sets the final oil pressure sensor type equal to a default oil pressure sensor type. In one embodiment, the default oil pressure sensor type at step 28 is the oil pressure switch, although the default oil pressure sensor may alternatively be the analog oil pressure sensor. In any case, algorithm execution advances from either of steps 126 and 128 to step 130 where algorithm execution is returned to its calling routine.

Figure 4:
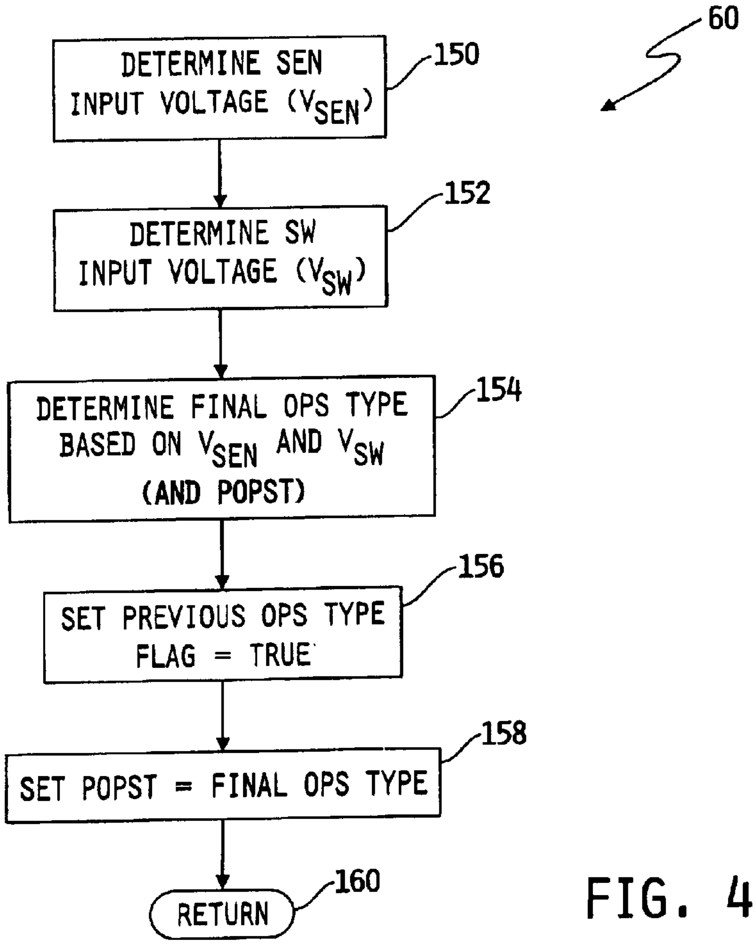
FIG. 4 represents a flowchart of one illustrative embodiment of the oil pressure sensor autodetection routine depicted at step 60 in the flowchart of FIG. 2.

Referring now to FIG. 4, one illustrative embodiment of the OPS autodetection routine 60 of algorithm 50, is shown. Routine 60 begins at step 150 where control computer 14 is operable to determine the voltage, $V_{SEN}$, at the SEN input of logic block. 20, corresponding to the A/DI input of control computer 14. Thereafter at step 152, control computer 14 is operable to determine the voltage, $V_{SW}$, at the SW input of logic block 20, corresponding to the SWITCH input of control computer 14. Thereafter at step 154, control computer 14 is operable to determine a final oil pressure sensor type based on $V_{SEN}$ and $V_{SW}$, and in some cases on POPST as well. In one embodiment, control computer 14 is operable to execute step 154 according to the $V_{SEN}$ and $V_{SW}$ assignments set forth in the following Table 2.

TABLE 2

| | | | | $V_{SW}$ | | | |
|---|---|---|---|---|---|---|---|
| | Open (0.0 V) | $V_{SEN}$ In-Range | Closed (5.0 V) | Open (5.0 V) | Closed (0.0 V) | POPST | Result |
| Valid Sensor | | X | | X | | n/a | SENSOR |
| Valid Switch | X | | | | X | n/a | SWITCH |
| Default 1 | | X | | | X | n/a | SWITCH |
| Default 2 | | | X | | X | n/a | SWITCH |
| Indeterminate | X | | | X | | SWITCH | SWITCH |
| Out-of-range high | | | X | X | | n/a | SENSOR |
| Out-of-range low | X | | | X | | SENSOR | SENSOR |

Those skilled in the art will recognize that Table 2 represents one illustrative $V_{SEN}$ and $V_{SW}$ assignment arrangement, and that alternate assignment arrangements may be implemented. For example, either or both of the default assignments may alternatively be set to SENSOR. Any such alternate assignment arrangements are intended to fall within the scope of the claims appended hereto.

Following step 154, algorithm execution advances to step 156 where control computer 14 is operable to set the previous OPS type flag to TRUE, and thereafter at step 158 to set the previous oil pressure sensor type value (POPST) to the final OPS type. Thereafter at step 160, algorithm execution returns to its calling routine.

From the foregoing it should be apparent that algorithm 50 of FIG. 2 is configured to automatically detect the type of oil pressure sensing device implemented in the engine 12, or to select an oil pressure sensor from more than one oil pressure sensors that are either implemented in the engine 12 or otherwise electrically connected to the wiring harness 34. Once the oil pressure sensing device type is detected or selected, the control computer 14 is operable pursuant to algorithm 50 to enable a corresponding oil pressure signal processing algorithm to produce oil pressure values consistent therewith. Algorithm 100 is configured to automatically detect the type of oil pressure sensing device when no such oil pressure sensing device type was detected in a previous engine operating cycle, and algorithm 150 is configured to automatically detect the type of oil pressure sensing device after an initial oil pressure sensing device type was determined in a prior engine operating cycle.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. System for automatically selecting an oil pressure sensor processing algorithm based on oil pressure sensor type, the system comprising:

an oil pressure sensing device producing an oil pressure signal indicative of oil pressure in an internal combustion engine, said oil pressure sensing device being one of an analog oil pressure sensor and an oil pressure switch; and a control computer having an analog input and a switch input with said oil pressure sensing device electrically connected to one of said analog and switch inputs, said control computer identifying said oil pressure sensing device as said analog oil pressure sensor and processing said oil pressure signal according a corresponding analog oil pressure sensor processing algorithm if a voltage level at said analog input is within a predefined voltage range while a voltage level at said switch input is at or near a first voltage level, said control computer identifying said oil pressure sensing device as said oil pressure switch and processing said oil pressure signal according a corresponding oil pressure switch processing algorithm if said voltage level at said switch input is at or near a second voltage level different from said first voltage level.

2. The system of claim 1 further including an ignition switch having at least an off position and an on position;

wherein said control computer is responsive to said ignition switch switching from said off position to said on position to monitor said voltage level at said analog input and said voltage level at said switch input, said control computer identifying said oil pressure sensing device as said analog oil pressure sensor if said voltage level at said analog input is within said predefined voltage range and said voltage at said switch input is at or near said first voltage level.

3. The system of claim 2 wherein said predefined voltage range is defined between a third voltage level greater than ground potential and a supply voltage;

and wherein said first voltage level is said supply voltage.

4. The system of claim 1 further including an ignition switch having at least an off position and an on position;

wherein said control computer is responsive to said ignition switch switching from said off position to said on position to monitor said voltage level at said analog input and said voltage level at said switch input, said control computer identifying said oil pressure sensing device as said oil pressure switch if said voltage level at said switch input is at or near said second voltage level.

5. The system of claim 4 wherein said second voltage level is ground potential.

6. The system of claim 1 wherein said control computer is configured to conduct an initial identification of said oil pressure sensing device if said oil pressure sensing device was not identified in a preceding engine operating cycle.

7. The system of claim 6 further including:

an ignition switch having at least an off position and an on position; and an engine speed sensor producing an engine speed signal indicative of engine rotational speed;

and wherein said control computer is responsive to said ignition switch switching from said off position to said on position to conduct said initial identification of said oil pressure sensing device by monitoring said voltage level at said analog input and said voltage level at said switch input and determining a first oil pressure sensing device type based on said voltage levels at said analog and switch inputs, said control computer identifying said oil pressure sensing device as said first oil pressure sensing device type if said engine speed signal remains below an engine speed threshold for a predefined time period.

8. The system of claim 7 wherein said control computer is configured to determine a second oil pressure sensor device type based on said voltage levels at said analog and switch inputs if said engine speed signal does not remain below said engine speed threshold for said predefined time period, said control computer identifying said oil pressure sensor device as said first oil pressure sensing device type if said first and second oil pressure sensor device types are identical and otherwise identifying said oil pressure sensor device as a preselected one of said analog oil pressure sensor and said oil pressure switch.

9. The system of claim 8 wherein said preselected one of said analog oil pressure sensor and said oil pressure switch is said oil pressure switch.

10. System for automatically selecting an oil pressure sensor processing algorithm based on oil pressure sensor type, the system comprising:

an oil pressure sensing device producing an oil pressure signal indicative of oil pressure in an internal combustion engine, said oil pressure sensing device being one of an analog oil pressure sensor and an oil pressure switch; and a control computer having an analog input and a switch input with said oil pressure sensing device electrically connected to one of said analog and switch inputs, said control computer identifying said oil pressure sensing device as said analog oil pressure sensor and processing said oil pressure signal according a corresponding analog oil pressure sensor processing algorithm if a voltage level at said analog input is at or near a first voltage level and a voltage level at said switch input is at or near a second voltage level different than said first voltage level and if said oil pressure sensing device was identified in a preceding engine operating cycle as an said analog oil pressure sensor.

11. The system of claim 10 further including an ignition switch having at least an off position and an on position;

wherein said control computer is responsive to said ignition switch switching from said off position to said on position to monitor said voltage level at said analog input and said voltage level at said switch input, said control computer identifying said oil pressure sensing device as said analog oil pressure sensor if said voltage level at said analog input is at or near said first voltage level and said voltage level at said switch input is at or near said second voltage level and if said oil pressure sensing device was identified in a preceding engine operating cycle as an said analog oil pressure sensor.

12. The system of claim 11 wherein said first voltage level is ground potential; and wherein said second voltage level is a supply voltage.

13. The system of claim 10 wherein said control computer is configured to conduct an initial identification of said oil pressure sensing device if said oil pressure sensing device was not identified in a preceding engine operating cycle.

14. The system of claim 13 further including:

an ignition switch having at least an off position and an on position; and an engine speed sensor producing an engine speed signal indicative of engine rotational speed;

and wherein said control computer is responsive to said ignition switch switching from said off position to said on position to conduct said initial identification of said oil pressure sensing device by monitoring said voltage level at said analog input and said voltage level at said switch input and determining a first oil pressure sensing device type based on said voltage levels at said analog and switch inputs, said control computer identifying said oil pressure sensing device as said first oil pressure sensing device type if said engine speed signal remains below an engine speed threshold for a predefined time period.

15. The system of claim 14 wherein said control computer is configured to determine a second oil pressure sensor device type based on said voltage levels at said analog and switch inputs if said engine speed signal does not remain below said engine speed threshold for said predefined time period, said control computer identifying said oil pressure sensor device as said first oil pressure sensing device type if said first and second oil pressure sensor device types are identical and otherwise identifying said oil pressure sensor device as a preselected one of said analog oil pressure sensor and said oil pressure switch.

16. The system of claim 8 wherein said preselected one of said analog oil pressure sensor and said oil pressure switch is said oil pressure switch.

17. System for automatically selecting an oil pressure sensor processing algorithm based on oil pressure sensor type, the system comprising:

an oil pressure sensing device producing an oil pressure signal indicative of oil pressure in an internal combustion engine, said oil pressure sensing device being one of an analog oil pressure sensor and an oil pressure switch; and a control computer having an analog input and a switch input with said oil pressure sensing device electrically connected to one of said analog and switch inputs, said control computer identifying said oil pressure sensing device as said oil pressure switch and processing said oil pressure signal according a corresponding oil pressure switch processing algorithm if a voltage level at said analog input is at or near a first voltage level and a voltage level at said switch input is at or near a second voltage level different than said first voltage level and if said oil pressure sensing device was identified in a preceding engine operating cycle as an said oil pressure switch.

18. The system of claim 17 further including an ignition switch having at least an off position and an on position;

wherein said control computer is responsive to said ignition switch switching from said off position to said on position to monitor said voltage level at said analog input and said voltage level at said switch input, said control computer identifying said oil pressure sensing device as said oil pressure switch if said voltage level at said analog input is at or near said first voltage level and said voltage level at said switch input is at or near said second voltage level and if said oil pressure sensing device was identified in a preceding engine operating cycle as an said oil pressure switch.

19. The system of claim 18 wherein said first voltage level is ground potential; and wherein said second voltage level is a supply voltage.

20. The system of claim 17 wherein said control computer is configured to conduct an initial identification of said oil pressure sensing device if said oil pressure sensing device was not identified in a preceding engine operating cycle.

21. The system of claim 20 further including:

an ignition switch having at least an off position and an on position; and an engine speed sensor producing an engine speed signal indicative of engine rotational speed;

and wherein said control computer is responsive to said ignition switch switching from said off position to said on position to conduct said initial identification of said oil pressure sensing device by monitoring said voltage level at said analog input and said voltage level at said switch input and determining a first oil pressure sensing device type based on said voltage levels at said analog and switch inputs, said control computer identifying said oil pressure sensing device as said first oil pressure sensing device type if said engine speed signal remains below an engine speed threshold for a predefined time period.

22. The system of claim 21 wherein said control computer is configured to determine a second oil pressure sensor device type based on said voltage levels at said analog and switch inputs if said engine speed signal does not remain below said engine speed threshold for said predefined time period, said control computer identifying said oil pressure sensor device as said first oil pressure sensing device type if said first and second oil pressure sensor device types are identical and otherwise identifying said oil pressure sensor device as a preselected one of said analog oil pressure sensor and said oil pressure switch.

23. The system of claim 22 wherein said preselected one of said analog oil pressure sensor and said oil pressure switch is said oil pressure switch.

* * * * *